(12) United States Patent
Forsberg (10) Patent No.: US 6,326,769 B1
(45) Date of Patent: Dec. 4, 2001

(54) LIMITATION OF POWER DISSIPATION IN LI BATTERY

(75) Inventor: Charles Forsberg, Skurup (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/725,021

(22) Filed: Nov. 29, 2000

(51) Int. Cl.$^7$ .......................... H01M 10/46; H01M 10/44
(52) U.S. Cl. .............................. 320/124; 320/160
(58) Field of Search .................................. 320/124, 125, 320/137, 155, 157, 158, 159, 160, 162, 163, 164

(56) References Cited

U.S. PATENT DOCUMENTS

| 5,952,815 | * | 9/1999 | Rouillard et al. .................... 320/116 |
| 5,998,966 | | 12/1999 | Gaza . |
| 6,087,810 | | 7/2000 | Yoshida . |

FOREIGN PATENT DOCUMENTS

0385145 A2  9/1990  (EP) .

OTHER PUBLICATIONS

European Standard Search Report; Date of Mailing: May 28, 2001 Date of Completion: May 23, 2001.

* cited by examiner

Primary Examiner—Edward H. Tso
(74) Attorney, Agent, or Firm—Burns, Doane, Swecker & Mathis, L.L.P.

(57) ABSTRACT

A method and apparatus for charging a rechargeable battery in which a constant current is first applied until the rated voltage of the battery is reached, followed by a period during which a reduced current is applied to the battery. The reduced current results in lowering the amount of unwanted heat being dissipated in the charge-current transistor connected to the battery. Finally, a constant voltage is applied to the battery to finish the charging cycle. Reducing the heat dissipation enables the use of smaller less expensive charge-current switch transistors, which for example, are advantageous in applications such as mobile communication devices or other portable electronics assemblies.

10 Claims, 5 Drawing Sheets

LIMITATION OF POWER DISSIPATION IN LI BATTERY

RELATED APPLICATION

This application is related to U.S. application Ser. No. 09/397,001 entitled "System and Method for Maintenance Charging of Battery Cells" filed on Sep. 15, 1999, the disclosure of which is expressly incorporated herein by reference, in its entirety.

BACKGROUND

The present invention pertains to a method and system for charging a battery which reduces the heat dissipation in the charging circuitry. More particularly, the present invention relates to methods and apparatus for reducing heat dissipation in one or more transistors that which controls the charge current of a battery cell by altering the charging cycle to provide a reduced current after the constant current stage and before constant voltage stage.

Due to the miniaturization of electronic circuits in consumer electronics, there are large numbers of devices presently in use which rely upon batteries for their power. Such battery operated consumer electronics devices include mobile phones, laptop computers, video cameras, and like electrical devices. Since the majority of these devices use rechargeable batteries, there is a large demand for rechargeable batteries and need for improving the charging characteristics thereof.

Rechargeable batteries must periodically be connected to an external charger or supply of power to be recharged. One consequence of recharging a battery is the heat produced during the charging operation. The heat due to recharging is generally undesirable for a number of reasons. For example, the heat may damage the battery or reduce its useful life, or even cause problems in the circuitry of the device itself. In extreme cases, the heat due to recharging may be a hazard to the user, or result in unsafe conditions.

There are several types of rechargeable battery cells which are in common use. Among the most commonly used rechargeable batteries are nickel-cadmium (Ni-Cd), sealed lead acid (SLA), nickel-metal-hydride (NiMH), lithium-ion (Li-ion) and lithium-polymer (Li-polymer). Each type of rechargeable battery is characterized by properties resulting from its battery chemistry and design.

Ni-Cd batteries are known to be inexpensive, but are subject to the memory effect, that is, voltage depression. The memory effect reduces the capacity of a Ni-Cd cell if the battery is not fully discharged before re-charging it. Ni-MH batteries tend to be more expensive than Ni-Cd, but have a higher charge capacity per unit of weight than Ni-Cd batteries. Furthermore, Ni-MH batteries are not subject to the pronounced memory effect of Ni-Cd batteries.

Li-ion batteries are advantageous over the aforementioned nickel-based batteries in that Li-ion batteries have a higher energy density per unit of mass. Li-ion batteries are also not subject to the memory effect that exists in other types of nickel-based battery cells, particularly Ni-Cd cells. An advantage of Li-polymer batteries is that they may be designed to be very thin, and even exhibit some flexibility instead of being structurally rigid. However, Li-polymer batteries are fairly high cost, relative to non-lithium battery technologies.

Another battery technology worth noting is that of sealed lead-acid (SLA) batteries. SLA batteries are based on well known lead-acid battery technology. SLA batteries are relatively low cost, but tend to be relatively heavy and cumbersome as compared to other types of batteries.

Figure 1:
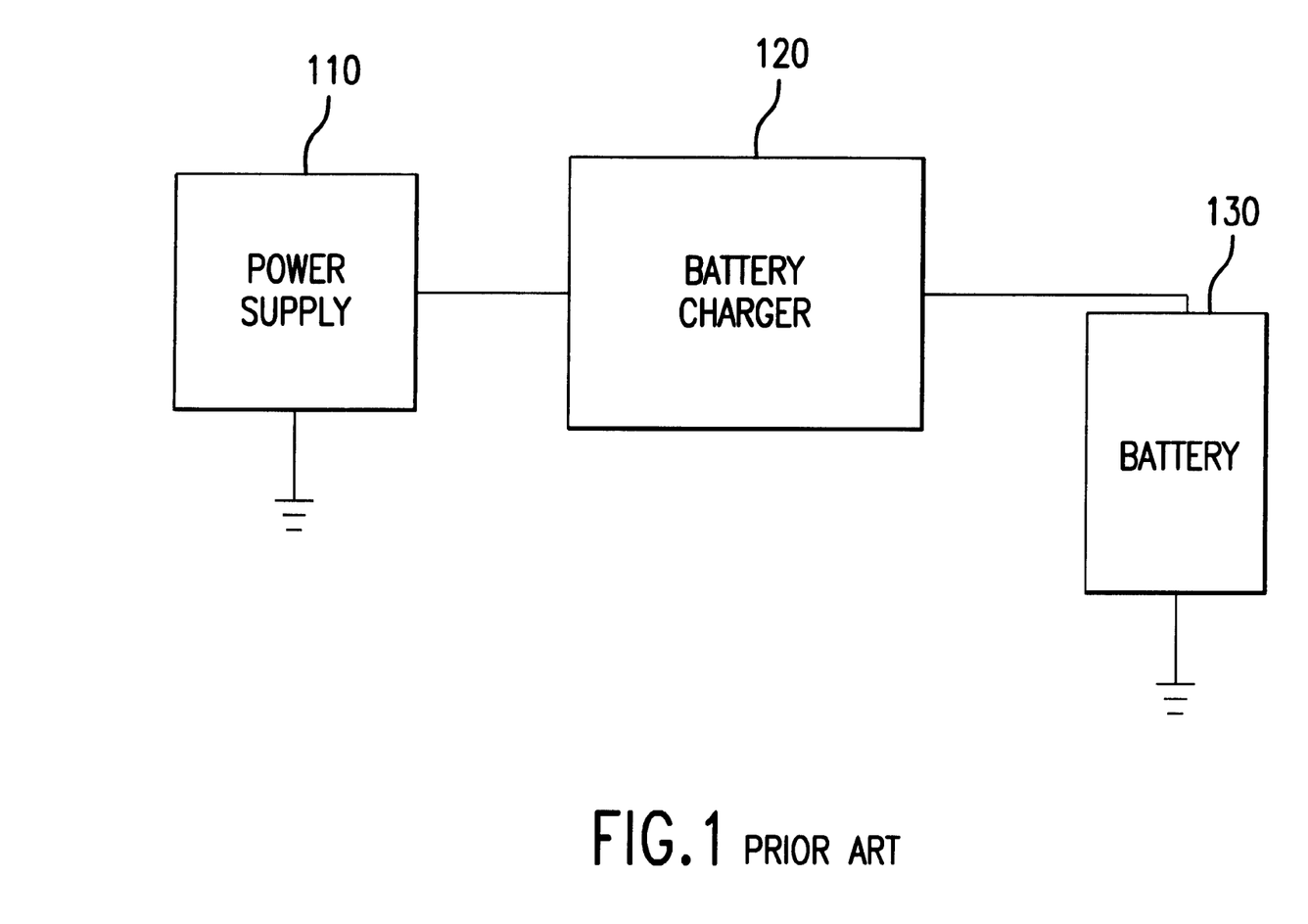
FIG. 1 is a conventional charging apparatus used to charge rechargeable batteries.

FIG. 1 is a conventional battery charging system 100. The charging system 100 typically includes a power supply 110 and a battery charger assembly 120 in connection with the battery 130. The charging system 100 may be configured so as to have the negative terminal of the battery 130 and the power supply 110 both connected to a ground potential, as shown in FIG. 1. Alternatively, the battery charger assembly 120 may be provided with connections to separately connect the negative terminal of the battery 130 to a negative terminal of the power supply 110 (not shown), with no need for use of a ground return.

The battery charger assembly 120 receives current and voltage inputs from the power supply 110, and in turn, provides current and voltage to the battery 130 in accordance with a conventional charging scheme. The constant current-constant voltage (CC-CV) charging operation is typically the conventional charging scheme which is used to recharge batteries.

Figure 2:
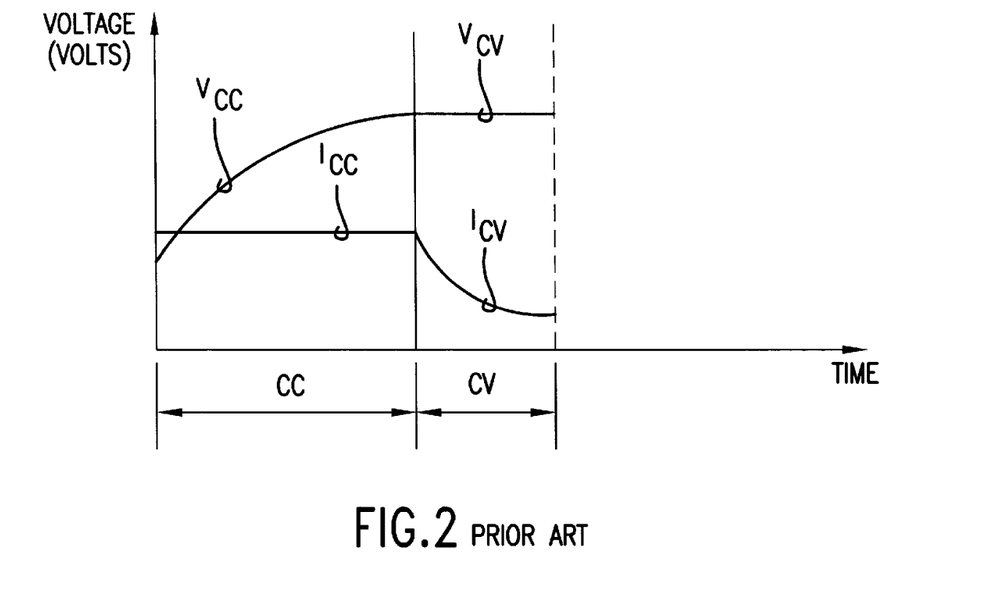
FIG. 2 depicts a current and voltage profile of a conventional CC-CV charging operation.

FIG. 2 depicts the typical current and voltage profile of a CC-CV charging operation. Rechargeable battery cells are often charged using such a CC-CV two-stage charging process in which the charger first provides a constant current, $I_{CC}$, which has an associated voltage $V_{CC}$. The charging process is then completed during a CV stage by providing a constant voltage, $V_{CV}$, which has an associated current $C_{CV}$.

During the CC stage of a conventional CC-CV charging process, the constant current $I_{CC}$ is applied to the battery until the cell approaches its rated voltage, $V_{MAX}$, sometimes referred to as the maximum voltage. The cell voltage steadily increases during the CC stage until the fully-charged cell voltage is reached. During the CV stage of a conventional CC-CV charging process, a constant voltage equal to the fully-charged cell voltage is applied to the battery until the battery is fully charged. A battery is characterized by a rated voltage, which is often defined in the specifications provided by the manufacturer of the battery. The rated voltage, which may also be referred to as the specified charging voltage or the rated charge voltage, is the maximum recommended voltage for charging the battery. The rated voltage depends upon the battery chemistry and other design parameters of the battery. Typically, the point at which the charging process transitions from the CC stage to the CV stage occurs when the charging voltage during the CC stage reaches the rated voltage of the battery.

SUMMARY

One drawback of conventional battery charging operations is the heat generated during charging. In particular, the present inventor recognized that much of the generated heat occurs during the first portion of the constant voltage charging period of the charging cycle. The generated heat results from a voltage drop in the charge current-switch transistor of the battery charger. The heat dissipation in the charge current-switch transistor may detrimentally affect the transistor itself, the charging circuitry, or even the device in which the battery is used. Accordingly, the present invention overcomes drawbacks of conventional charging systems by reducing the heat generated during this juncture of the charging process. Hence, through use of the present invention, the transistor heat dissipation may be reduced which enables the use of smaller less expensive charge-current transistors. This is advantageous in mobile communications devices or other portable electronics assemblies in which miniaturization and weight reduction is important.

In accordance with an exemplary method of the present invention for charging a battery, following a first stage of charging the battery in which a constant current is provided to the battery, a reduced amount of current is provided to the battery during a second stage of charging the battery, said reduced amount of current being less than said constant current. Then, during a third charging stage, a constant voltage is applied to the battery to complete the charging operation.

A battery charging apparatus in accordance with an exemplary embodiment of the present invention has battery charging circuitry and a controller. Following a first constant current stage of charging the battery, the controller causes the battery charging circuitry to provide a reduced amount of current to the battery during a second stage of charging the battery. Then, following the second stage, a constant voltage is applied to the battery in a third stage of charging the battery.

It should be emphasized that the terms "comprises" and "comprising," when used in this specification, are taken to specify the presence of stated features, integers, steps or components; but the use of these terms does not preclude the presence or addition of one or more other features, integers, steps, components or groups thereof.

BRIEF DESCRIPTION OF THE DRAWINGS

The objects, features and advantages of the present invention will become more readily apparent to those skilled in the art upon reading the following detailed description, in conjunction with the appended drawings, in which.

DETAILED DESCRIPTION

These and other aspects of the invention will now be described in greater detail in connection with a number of exemplary embodiments. To facilitate an understanding of the invention, some aspects of the invention may be described in terms of sequences of actions to be performed by elements of a computer system. It will be recognized that in each of the embodiments, the various actions could be performed by specialized circuits (e.g., discrete logic gates interconnected to perform a specialized function), by program instructions being executed by one or more processors, or by a combination of both.

Moreover, the invention can additionally be considered to be embodied entirely within any form of computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as "logic configured to" perform a described action, or alternatively as "logic that" performs a described action.

In this disclosure, the terms "cell" and "battery" are used interchangeably, as is common in the art. It is recognized that a battery may include more than one cell, and a charger may be adapted to charge a single cell or a battery consisting of more than one cell. In addition, the term "stage" (e.g., CC stage or CV stage of charging) refers to a portion or phase of the charging process (or charging cycle) during which the current and/or voltage is provided in a particular manner. For example, during the CV stage, a constant voltage is applied to the battery.

A problem of conventional charging methods, which was recognized by the present inventor, pertains to the heat generated during the charging process. In particular, the inventor recognized that relatively little heat is generated during the CC stage of charging, while much of the heat due to the charging process is generated during the first portion of the CV stage of charging. This may be understood by examining FIG. 3 which depicts a power dissipation profile for a CC-CV charging operation.

Figure 3:
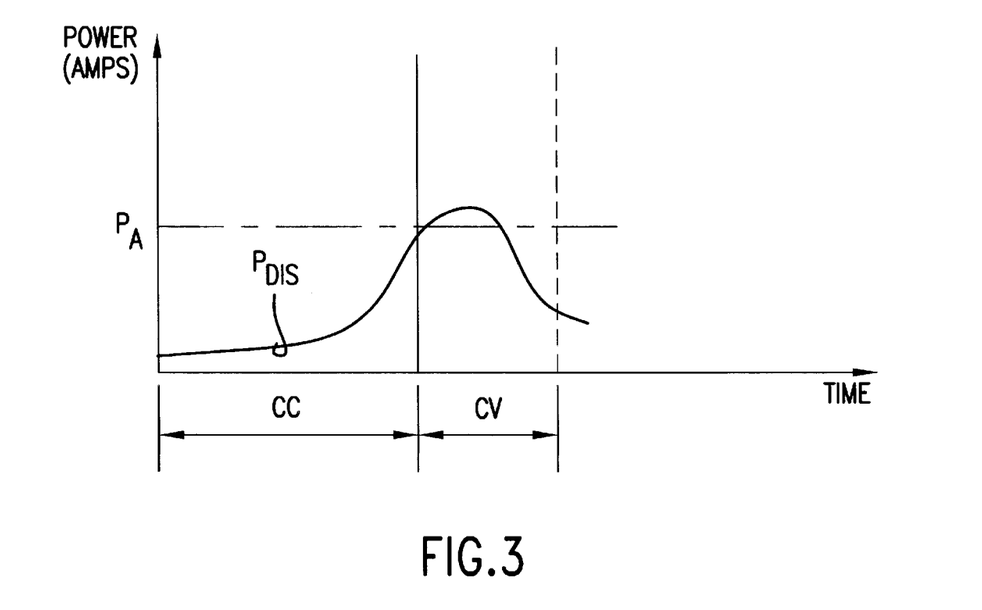
FIG. 3 depicts a power dissipation profile for the CC-CV charging operation of FIG. 2.

During the CC stage of charging, a power supply in the charger freely provides as much current as it can provide (i.e., $I_{CC}$) to the battery via a transistor charge current-switch in the charger circuitry. The generation of a relatively large amount of current in this manner results in the power supply voltage being pulled down to the voltage of the battery (i.e., $V_{CC}$). As the battery becomes charged up, the battery voltage $V_{CC}$ increases from a discharged level up to the rated voltage of the battery, $V_{MAX}$. Hence, during the CC stage of charging, the power supply is pulled down to approximately the level of the battery voltage, and there is little or no voltage drop across the charge current-switch transistor.

However, during the CV stage of charging, the transistor is controlled to provide no more than the rated voltage of the battery (e.g., 4.1V) at a constant voltage level. In the CV stage, as the battery begins to reach its charge capacity, the battery begins to require less current. That is, $I_{CV}$ begins to fall. Since the power supply is providing a smaller amount of current, the voltage of the power supply is no longer being pulled down. Because the power supply voltage is not being pulled down and the voltage provided to the battery is held constant at $V_{CV}=V_{MAX}$, a voltage drop develops in the charger circuitry. In other words, during the CV stage, the charging voltage is held constant at $V_{MAX}$ as an increasingly smaller charging current $I_{CV}$ flows into the battery as the battery becomes fully charged. The charging current $I_{CV}$ is thus too small to cause the power supply voltage to be substantially pulled down, which, in turn, causes a voltage drop to develop across the transistor terminals as a result of the difference between the voltage of the power supply and the battery voltage. This, in turn, causes power to be dissipated in the transistor and heat to be generated. The heat is dissipated in the charge current-switch transistor, which is typically part of the battery charging circuitry electrically connected to the battery. This, in turn, results in the generation of heat due to the voltage drop in the transistor.

FIG. 3 depicts a power dissipation profile of the charge current-switch transistor for a CC-CV charging operation in which the power dissipation rises above an acceptable level $P_A$ during the CV stage of charging, as recognized by the inventor. That is, FIG. 3 illustrates a power dissipation for the current and voltage profile of a CC-CV charging operation of FIG. 2. Heat is generated in the charge current-switch transistor as a result of power dissipation $P_{DIS}$ which is due to the voltage across the terminals of the transistor and the current through the transistor. As shown in the figures, the CC-CV charging operation of FIG. 2 causes the power dissipation $P_{DIS}$ of FIG. 3 to rise above an acceptable level of power dissipation, $P_A$. The acceptable level of power dissipation $P_A$ is generally determined on the basis of the specifications or design parameters of the charging circuitry or the device in which the circuitry resides. The resultant heat generated in the charge current-switch transistor may detrimentally affect the transistor or charger circuitry, the battery, or even the device in which the battery resides, if $P_A$ is exceeded.

Figure 4:
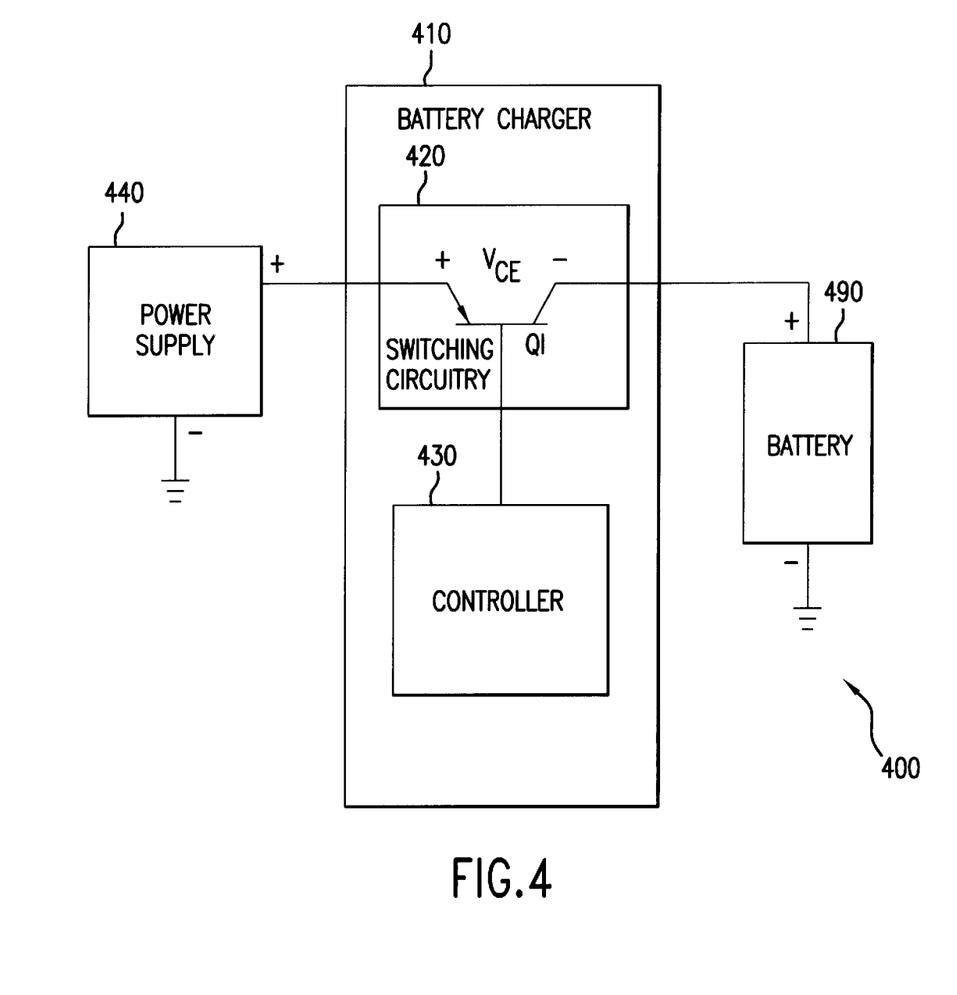
FIG. 4 depicts an apparatus for implementing the present invention.

FIG. 4 depicts a system 400 for implementing the present invention. The system 400 has a battery charger 410 containing a controller 430 in communication with switching circuitry 420. The switching circuitry 420 is electrically connected to a power supply 440 and a battery 490. The controller 430 represents the physical embodiment of the logic for implementing the invention. The logic of the controller 430 may be implemented in various forms, as set forth above, and may be located within the battery charger 410, the battery 490 or the device using the battery 490.

The controller 430 causes the switching circuitry 420 to apply various levels of voltage and/or current to the battery 490 during the charging process in order to recharge the battery 490. For example, during the CC stage of charging, the switching circuitry 420 supplies a constant current to the battery 490. During the CV stage of charging, the switching circuitry 420 applies a constant voltage to the battery 490.

Figure 5:
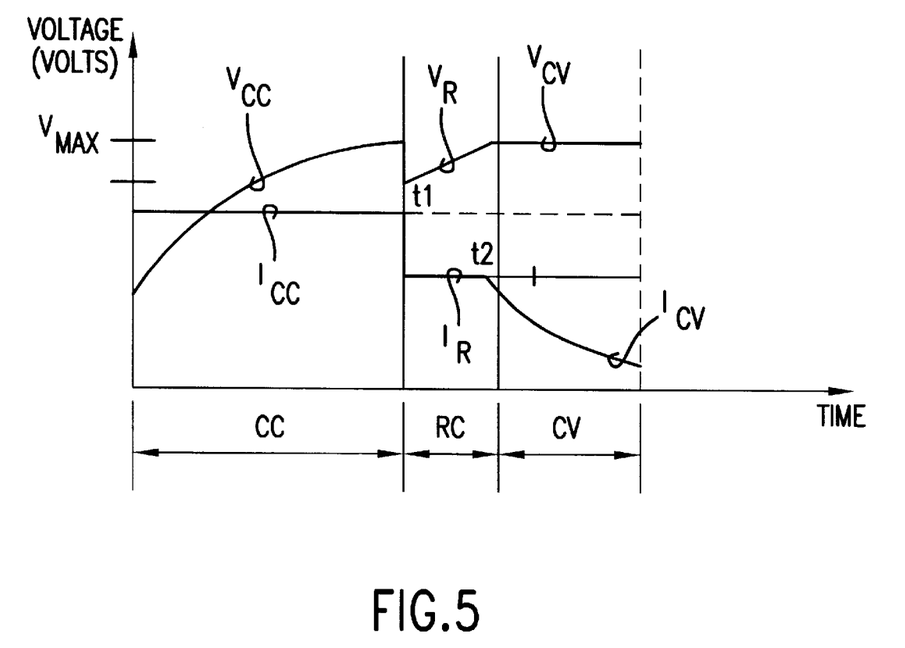
FIG. 5 depicts an exemplary current and voltage profile of a charging operation in accordance with the present invention.

In accordance with the present invention, following the CC stage and before the CV stage, the controller 430 causes the switching circuitry 420 to supply a reduced amount of current to the battery 490. As shown in FIG. 5, the reduced amount of current, $I_R$, is supplied to the battery 490 between the time t1 and t2. The reduced current $I_R$ being applied at this earlier stage in the charge cycle results in a lower voltage $V_R$ being applied to the battery 490.

The switching circuitry 420 contains a charge current-switch transistor Q1. In alternative embodiments of the present invention, the switching circuitry 420 may contain more than one switch transistor, and/or other circuitry for biasing, switching or logic purposes.

Figure 6:
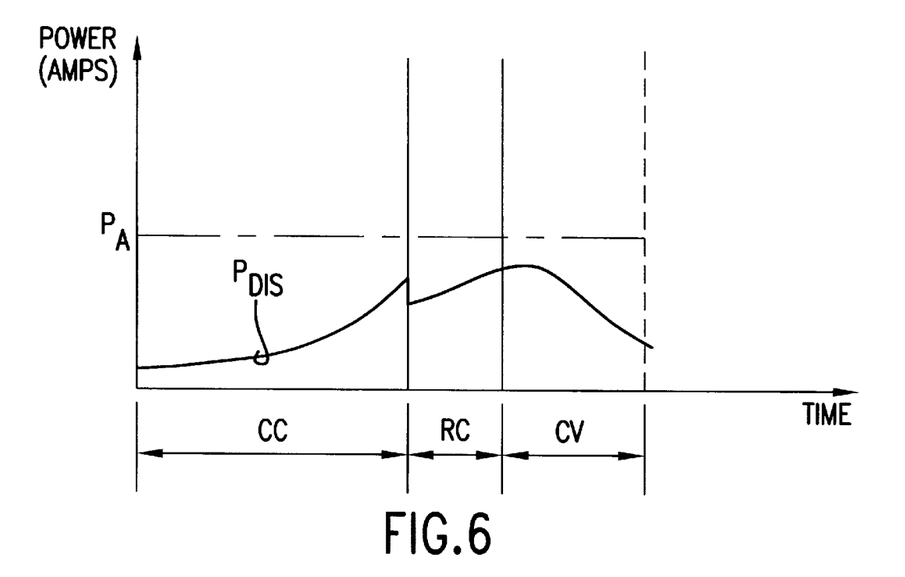
FIG. 6 depicts a power dissipation in accordance with the present invention for the exemplary current and voltage profile of a charging operation of FIG. 5.

During the CC stage of charging, the current $I_{CC}$ provided by the power supply 440 is preferably at or near the maximum amount of current that the power supply 440 can provide. The current $I_{CC}$ is provided to the battery 490 via the transistor charge current-switch Q1 in the switching circuitry 420. Because the power supply 440 is generating a relatively large amount of current, the voltage of power supply 440 is pulled down to the charging voltage of the battery, $V_{CC}$ during the CC stage. Therefore, little or no voltage drop $V_{CE}$ develops across the terminals of charge current-switch transistor Q1 in the CC stage. In accordance with the present invention, a reduced current stage (RC) stage is provided in the charging process. The base of the transistor Q1 is controlled during the RC stage of charging to provide a reduced amount of current $I_R$ Reducing the charging current to $I_R$ avoids excessive power dissipation and heat due to the power supply voltage not being pulled down by the generation of current. In other words, the reduced current $I_R$ helps to prevent an excessive voltage $V_{CE}$ from developing across the terminals of the charge current-switch transistor Q1. As explained above, the voltage $V_{CE}$ is due to one terminal being biased at the power supply voltage (e.g., 6V) while the other terminal is controlled to be at the rated voltage of the battery (e.g. 4.1V). That is, in accordance with the present invention, a reduced current ($I_R$) is applied during the time period t1 to t2, causing the power dissipation $P_{DIS}$ to remain below an acceptable amount of power dissipation $P_A$, as shown in FIG. 6. Since the power dissipation $P_{DIS}$ remains below the acceptable power dissipation $P_A$, the generated heat also remains at an acceptable level.

The power supply 440 may be the cigarette lighter socket of an automobile, power derived from an electrical wall outlet, or like source of electrical power. The battery 490 may be a lithium-ion (Li-ion), lithium-polymer (Li-polymer), or like type of battery which is rechargeable.

FIG. 5 depicts an exemplary current and voltage profile of a charging operation in accordance with the present invention. The charging operation has a period between time t1 and t2 of FIG. 5 following the constant current CC period and before the constant voltage CV period during which a reduced current $I_R$ is applied to the battery cell being charged. This also results in the charge voltage applied to the battery, $V_R$, being lower than $V_{MAX}$ between time t1 and t2. The current $I_R$ is reduced in the sense that $I_R$ is less than the current associated with the initial part of the conventional CV stage of charging depicted in FIG. 2. The reduced current $I_R$ may be a constant current which is less than the level of constant current applied to the cell during the CC stage of charging. In other words, the reduced current $I_R$ is less than the current which would result from the application of the rated voltage $V_{CV}=V_{MAX}$. The reduced current $I_R$ and corresponding reduced voltage $V_R$ can be seen by comparing the current and voltage depicted in FIG. 5 following the CC stage (i.e., from time t1 to t2) with the corresponding current and voltage parameters of FIG. 2 at the beginning of the CV stage of charging.

The reduced current $I_R$ may be specified as a fraction or percentage of the current applied during the CC stage, $I_{CC}$ e.g., $I_R=(0.8\times I_{CC})$ Alternatively, other like means of specifying a reduced current may be used in accordance with the present invention. For example, the amount by which the current is decreased at time t1 (i.e., $I_{CC}-I_R$) may be chosen to suit the design characteristics, heat dissipation tolerances, or other parameters of the transistor Q1, the switching circuitry 420, the battery 490 being charged, or of the charger 410, or even the device in which the battery 490 resides.

In general, the amount or rate of decreasing the current from $I_{CC}$ to $I_R$ is a greater amount, or more rapid rate of reduction, of current than the approximately linear current reduction which takes place in conventional CC-CV charging when the voltage is held constant. This aspect of the present invention may be better understood by reference to FIG. 5, in which the current-versus-time relationship remains below an imaginary line drawn between the points t1 and t2. That is, in the present invention the current decreases more rapidly or by a greater amount (e.g., a step function) than the linear rate of current reduction in a conventional CC-CV charger at the beginning of the CV stage, as shown in FIG. 2 at the beginning of the CV stage of charging.

The charging operation of the present invention depicted in FIG. 5 results in the power dissipation profile shown in FIG. 6 which remains safely at or below the acceptable level of dissipated power, $P_A$ In the first part of the CV stage of charging, the power supply is not freely providing a large amount of current, and hence the power supply voltage is not being pulled down. Even though the voltage of the power supply is not pulled down, the level of dissipated heat is lowered due to a reduced amount of charge current $I_R$ being provided in conjunction with the associated charge voltage $V_R$. The acceptable level of power dissipation, $P_A$, may be specified in accordance with the parameters of the charge current-switch transistor Q1, or other charger circuitry, or the device using the battery.

In accordance with the present invention, the point at which the constant voltage CV stage of battery cell charging begins, shown as time t2 of FIG. 5, depends upon the parameters of the charging circuitry and the cell being charged. The time t2 at which the CV stage of battery cell charging begins may be determined such that $P_{DIS}$ of FIG. 6 is within the specified tolerances based upon the parameters of the charge current-switch transistor Q1. Therefore, the time between t1–t2 is affected by, and depends upon, the parameters of the charge current-switch transistor Q1 and the battery chemistry and design characteristics of the battery 490 being charged. The time duration of the reduced current RC stage, t1 to t2, may be determined in any of several alternative manners. For instance, t1–t2 may be based upon the expected heat dissipation of the transistor Q1 given the ambient conditions (e.g., temperature, humidity, etc.) in which the battery charger 410 is expected to be operating. Alternatively, the time period t1 to t2 may be set to be a fraction of the overall charging time (e.g., one tenth of the charging time for the battery) or a predetermined period of time (e.g., 10 minutes) which is expected to keep the charge current-switch transistor within its specified tolerance for heat dissipation.

The present invention may alternatively be thought of in terms of a reduced voltage $V_R$ being applied to the battery at time t1 following the end of the CC stage, rather than the reduced current $I_R$ being provided. In other words, since the current and voltage of the battery 490 are related to each other, the application of a reduced voltage $V_R$ results in a reduced current $I_R$. The reduced voltage $V_R$ applied to the battery may be increased between time t1 and t2, as depicted in FIG. 5. As described above in regard to applying a reduced current $I_R$, the amount and rate of applying a decreased voltage $V_R$ may be specified in accordance with the design characteristics, heat dissipation tolerances, or other parameters of the battery being charged. Upon reaching the rated voltage $V_{MAX}$ at time t2, the constant voltage stage CV of the charging process begins. During the CV stage, a constant voltage $V_{CV}$ is applied, and the charge current into the battery diminishes at a gradual (e.g., exponential) rate, until the battery is fully charged.

Figure 7:
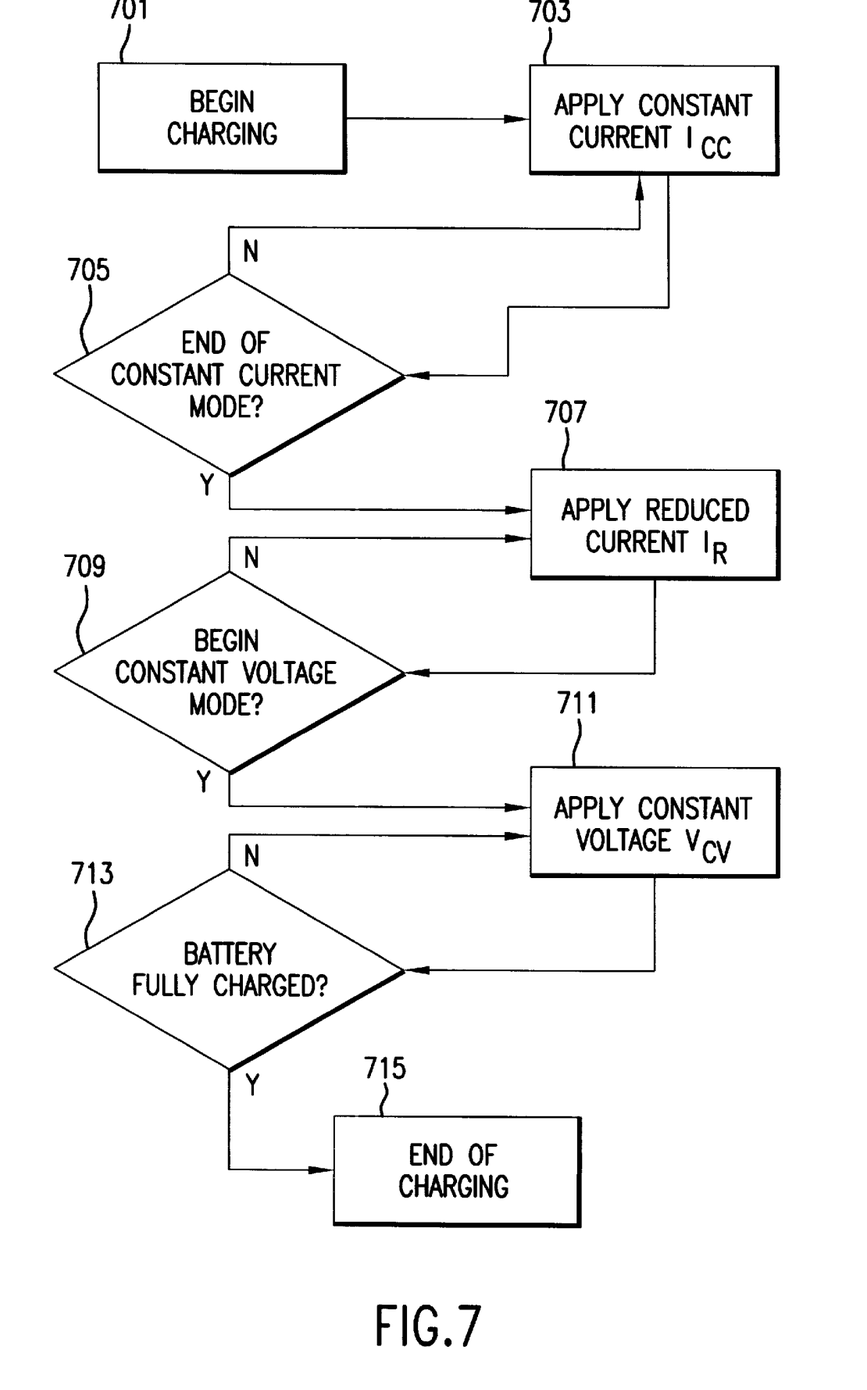
FIG. 7 depicts a method according to the present invention.

FIG. 7 depicts a method according to the present invention. After the charging operation of the present invention has begun at step 701, the method proceeds to step 703 where a constant current $I_{CC}$ is applied to the battery. The constant current $I_{CC}$ is applied to the battery during the CC stage of charging until, in step 705, it is determined that the constant current mode has ended. If the constant current mode has not ended, the constant current $I_{CC}$ continues to be applied to the battery, in accordance with the "no" branch from step 705 to step 703. In accordance with a preferred embodiment of the present invention, the determination of the end of the constant current mode in step 705 occurs when the charging voltage of the CC stage, $V_{CC}$, reaches the rated voltage $V_{MAX}$ of the battery. This may be determined through use of a voltage sensor. Alternatively, the end of the CC stage may be determined by using other types of sensors (e.g., current, power or temperature sensors), or through the use of a timer to ascertain when a predetermined amount of time has passed, or in a like manner.

Upon determining in step 705 that the constant current mode has ended, the method proceeds to step 707, in accordance with the "yes" branch from step 705. In step 707, a reduced current $I_R$ is applied to the battery being charged. The reduced current $I_R$ is less than the current which would result from the application of the rated voltage $V_{MAX}$. Providing $I_R$ in step 707 reduces the heat dissipation in the charger, as compared to the application of $V_{CV}=V_{MAX}$.

In step 709, the determination is made as to whether the constant voltage CV stage is to be started. The CV stage begins at time t2 shown in FIG. 5. The time t2 may be determined in step 709 such that an amount of power dissipated in the charge current-switch transistor, $P_{DIS}$, is within a specified amount of power dissipation, $P_A$, as depicted in FIG. 6. In an alternative embodiment, the time t2 may be a predetermined amount of time after the reduced current $I_R$ is first applied at time t1. In another alternative embodiment, the time t2 when the reduced current RC stage ends, may be based upon when the RC stage charging voltage $V_R$ again reaches the rated voltage $V_{MAX}$. This may be better understood by reference to FIG. 5. At time t1, as a result of the current being stepped down from $I_{CC}$ to $I_R$, the charging voltage steps down in a corresponding manner. After t1, the charging voltage $V_R$ increases as $I_R$ is applied to the battery, until the voltage equals $V_{MAX}$.

Upon determining in step 709 that the constant voltage CV mode is to begin, the method proceeds to step 711, in accordance with the "yes" branch from step 709. During step 711, a constant voltage, for instance, $V_{CV}=V_{MAX}$, is applied to the battery. In step 713, it is determined whether the battery is fully charged or not. The constant voltage of step 711 is applied to the battery until it is fully charged, in accordance with the "no" branch from step 713. When the battery is fully charged, or the charging cycle has otherwise been completed, the method ends at step 715 in accordance with the "yes" branch from step 713.

The aforementioned embodiments and description of the present invention are intended to be illustrative rather than restrictive. Many variations of implementing the present invention may be derived from the description contained herein by a person skilled in the art. All such variations and modifications are considered to be within the scope and spirit of the present invention, as defined by the following claims.

What is claimed is:

1. A method of charging a battery comprising:

providing a constant current to the battery during a first stage of charging the battery, wherein a voltage of the battery increases as the constant current is applied thereto, and the first stage continues until a voltage of the battery has reached a rated voltage of the battery;

ending the first stage a predetermined period of time after said voltage of the battery reaches the rated voltage of the battery;

providing a reduced amount of current to the battery during a second stage of charging the battery, said reduced amount of current being less than said constant current; and applying a constant voltage to the battery during a third stage of charging the battery.

2. The method of claim 1, wherein a voltage of the battery associated with the reduced current is less than a voltage of the battery associated with the constant current.

3. A method of charging a battery comprising:

providing a constant current to the battery during a first stage of charging the battery, wherein a voltage of the battery increases as the constant current is applied thereto, and the first stage continues until a voltage of the battery has reached a rated voltage of the battery;

providing a reduced amount of current to the battery during a second stage of charging the battery, said reduced amount of current being less than said constant current; and applying a constant voltage to the battery during a third stage of charging the battery.

4. The method of claim 3, further comprising:

ending the first stage upon said voltage of the battery reaching the rated voltage of the battery.

5. The method of claim 3, wherein the second stage continues until the reduced amount of current has dropped so power dissipation in a charge transistor is reduced to an acceptable level.

6. A battery charging apparatus comprising:

battery charging circuitry; and a controller;

wherein, following a first constant current stage of charging the battery, the controller causes the battery charging circuitry to provide a reduced amount of current to the battery during a second stage of charging the battery, and following the second stage applies a constant voltage to the battery during a third stage of charging the battery;

wherein a battery being charged is characterized by a voltage which increases as the constant current is applied thereto; and wherein the first stage continues until a voltage of the battery has reached a rated voltage of the battery, the controller ending the first stage a predetermined period of time after said voltage of the battery reaches the rated voltage of the battery.

7. A battery charging apparatus comprising:

battery charging circuitry; and a controller;

wherein, following a first constant current stage of charging the battery, the controller causes the battery charging circuitry to provide a reduced amount of current to the battery during a second stage of charging the battery, and following the second stage applies a constant voltage to the battery during a third stage of charging the battery; and wherein the battery is characterized by a voltage which increases as the constant current is applied thereto, and the first stage continues until a voltage of the battery has reached a rated voltage of the battery.

8. The battery charging apparatus of claim 7, wherein the controller ends the first stage upon said voltage of the battery reaching the rated voltage of the battery.

9. The battery charging apparatus of claim 7, wherein the second stage continues until the reduced amount of current has dropped so power dissipation in a charge transistor is reduced to an acceptable level.

10. The battery charging apparatus of claim 6, wherein the battery is characterized by a voltage associated with the reduced current which is less than a voltage of the battery associated with the constant current.

* * * * *